(12) United States Patent
Cecconi

(10) Patent No.: US 6,356,047 B1
(45) Date of Patent: Mar. 12, 2002

(54) STARTING DEVICE FOR ELECTRIC MOTORS, WHICH INCLUDES A PTC RESISTOR AND A RELAY IN SERIES

(75) Inventor: Pietro Cecconi, Monza (IT)

(73) Assignee: Electrica S.r.l., Milan (IT)

( * ) Notice: Subject to any disclaimer, the term of this patent is extended or adjusted under 35 U.S.C. 154(b) by 0 days.

(21) Appl. No.: 09/437,742

(22) Filed: Nov. 10, 1999

(30) Foreign Application Priority Data

Dec. 7, 1998 (IT) .......................................... PC980022 U

(51) Int. Cl.[7] .................................................. H02P 7/36
(52) U.S. Cl. ...................... 318/791; 318/778; 318/783; 318/782; 318/430; 318/471; 318/472; 318/443
(58) Field of Search .................................. 318/791, 778, 318/783, 782, 430, 471, 472, 443

(56) References Cited

U.S. PATENT DOCUMENTS

| | | | | |
|---|---|---|---|---|
| 3,737,622 A | * | 6/1973 | Hallgreen | 318/443 |
| 3,761,792 A | * | 9/1973 | Whitney et al. | 318/443 |
| 3,903,456 A | * | 9/1975 | Schaefer | 318/443 |
| 3,919,612 A | * | 11/1975 | Ratzel et al. | 318/443 |
| 4,499,517 A | * | 2/1985 | Lisauskas | 318/785 |
| 4,724,504 A | * | 2/1988 | Prouty | 361/165 |
| 5,053,908 A | * | 10/1991 | Cooper et al. | 318/443 |
| 6,057,666 A | * | 5/2000 | Dougherty et al. | 318/443 |

* cited by examiner

*Primary Examiner*—Karen Masih
(74) *Attorney, Agent, or Firm*—Young & Thompson

(57) ABSTRACT

A starting device for electric motors which is designed to be fitted to compressor motors or the like, and includes a PTC resistor in series with a relay inserted between the line and the motor start winding.

5 Claims, 2 Drawing Sheets

STARTING DEVICE FOR ELECTRIC MOTORS, WHICH INCLUDES A PTC RESISTOR AND A RELAY IN SERIES

BACKGROUND OF THE INVENTION

This invention relates to a starting device for electric motors which is designed in particular to be fitted to compressor motors or the like, and consists of a PTC resistor in series with a relay.

The starting device in accordance with the invention, which is inserted between the line and the motor start winding, offers all the advantages deriving from the use of a PTC resistor without the limitations and drawbacks that this device would involve if used alone.

The contacts of the relay and the resistor are preferably housed in a single L-shaped box container so that a protection device can be inserted in the free space without increasing the overall size of the assembly. The device thus configured can be installed on the compressor merely by attaching it to the standardised connector fitted on the compressor. This system produces a more efficient, practical starting device which is easy and convenient to instal, and more functional.

DESCRIPTION OF THE RELATED ART

In refrigerators, the unit constituted by the motor and compressor usually consists of a single, hermetically sealed block housed in a casing to which suitable connectors are fitted so that starting and protection devices can be connected to it.

These connectors are standardised, and usually comprise three male contacts to which the starting and protection device is connected. The starting and protection device comprises systems designed to supply the short-time pickup current needed to start the motor, together with thermal protection devices.

The present invention relates to a starting device of this kind. For a long time, a relay was used as the starting device; the relay closed for the time required to supply the motor windings with pickup current, and opened when the motor reached the required number of revolutions. More recently, relays have often been replaced by positive temperature coefficient (PTC) resistors, which present various advantages over relays. The PTC is a resistor whose resistance is added to that of the windings, so that the windings can be made with fewer coils, thus producing a saving of material and a slight reduction in size. A PTC resistor can consequently be advantageously used to replace the simple relay.

However, as the PTC resistor is always connected, it continues to absorb current, albeit to a minimal extent (a few watts per hour).

SUMMARY OF THE INVENTION

The aim of this invention is to offer a PTC motor starting device which does not present the drawback described above.

For this purpose, the present invention offers a starting device which comprises a relay and a PTC resistor in series.

When the motor has started, the relay opens and the PTC resistor is disconnected and stops absorbing current. The PTC resistor also protects the winding, because if the relay remains powered for any reason, for example if the contacts fail to open, the temperature of the PTC resistor increases, with the result that its resistance also increases and the winding is prevented from burning or being damaged.

It is thus possible to obtain the advantages deriving from the use of the PTC resistor without the associated drawbacks.

BRIEF DESCRIPTION OF THE DRAWINGS

This invention will now be described in detail, by way of example but not of limitation, by reference to the annexed figures in which.

DESCRIPTION OF THE PREFERRED EMBODIMENTS

Figure 3:
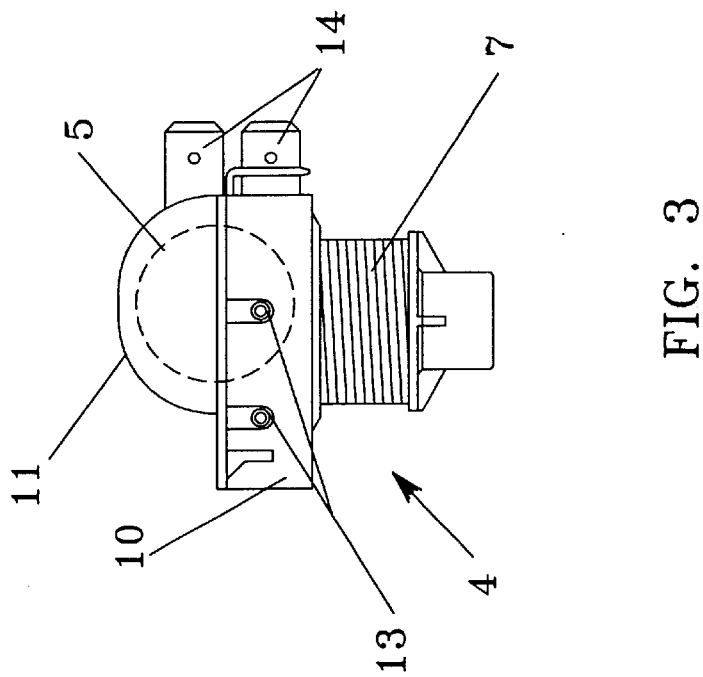
FIG. 3 is a view of the device from the side fitted with the couplings used to attach it to the connector of a motor
Figure 1:
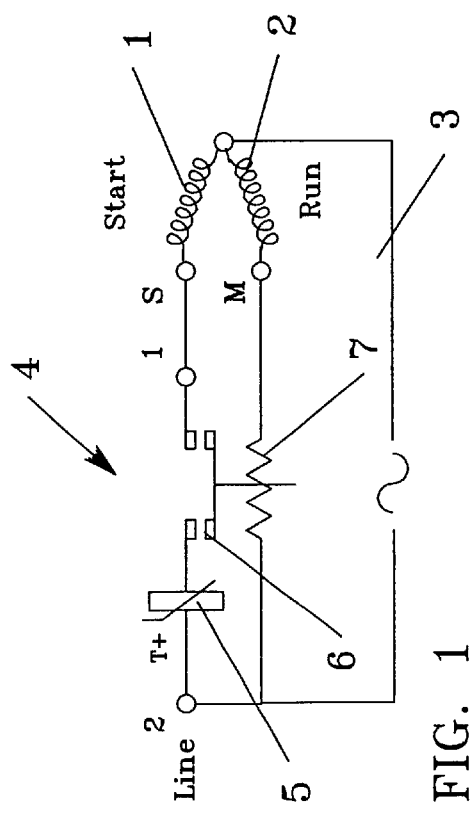
FIGS. 1 and 2 show wiring diagrams for the device in accordance with the invention
Figure 2:
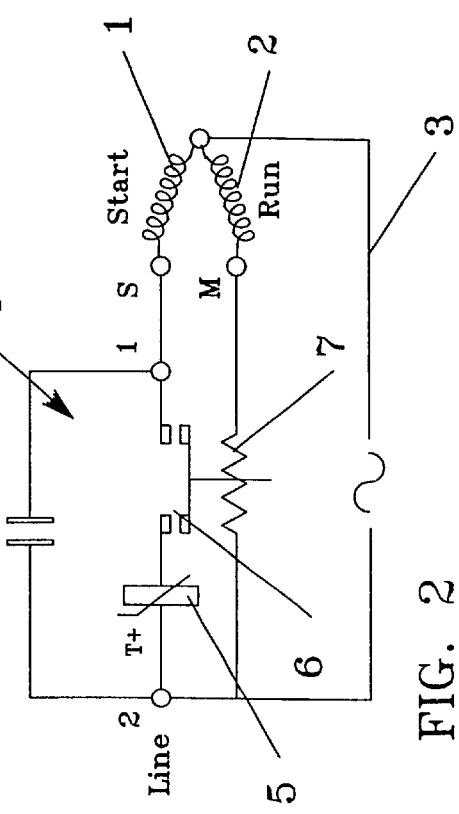

Two possible circuit configurations for the device in accordance with the invention are illustrated in FIGS. 1 and 2. In the FIGS. nos. 1 and 2 indicate the start and run windings of an electric motor respectively, the said windings being connected on one side to a common power line 3 and on the opposite side to the starting device in accordance with the invention.

The said starting device comprises a relay assembly shown as 4 and a PTC resistor 5 installed in series with the relay contacts, shown as 6. No. 7 indicates the coil of the said relay.

The device is also illustrated in FIGS. 3 to 7, in which no. 8 indicates the connector connected to the motor, which presents three contacts 9. The contacts of relay 4 are contained in a box 10 closed by a lid 11 which is shaped to form a roughly L-shaped container, as illustrated in the side views shown in FIGS. 5 and 6.

This shape is particularly practical, because it produces an assembly with very compact overall dimensions.

Figure 4:
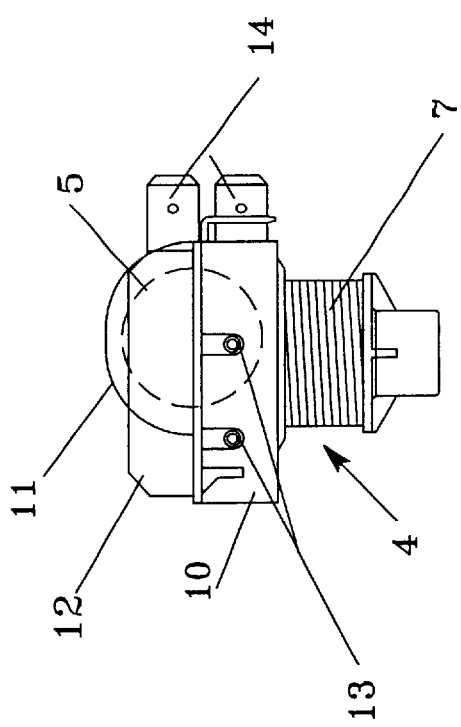
FIG. 4 is a view from above of the device in accordance with the invention
Figure 7:
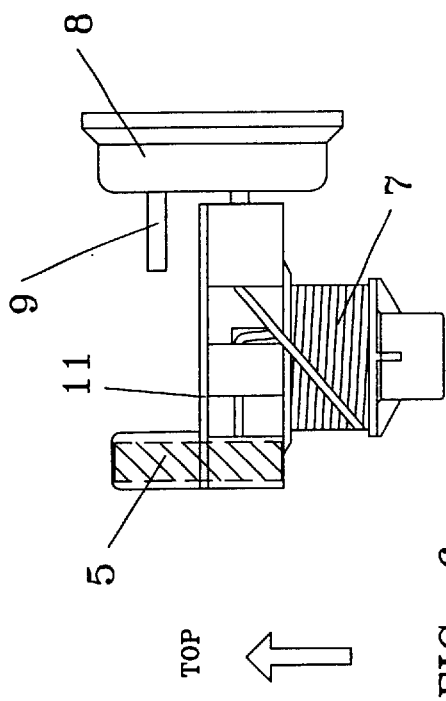
FIG. 7 is a view corresponding to the one shown in FIG. 2, with a protection device fitted.
Figure 5:
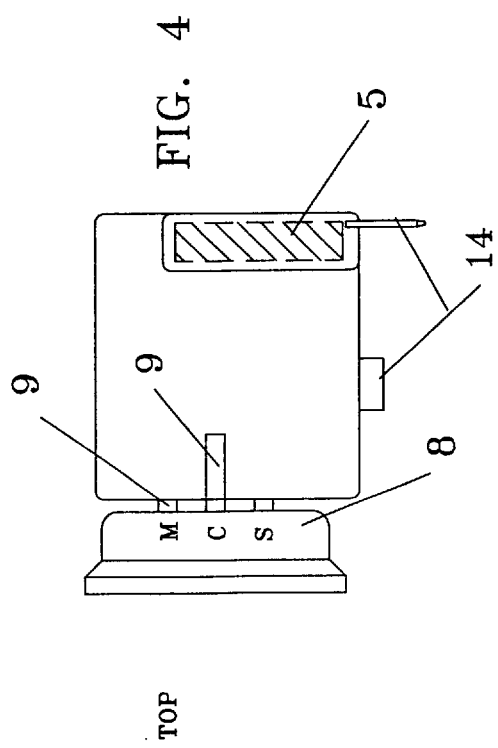
FIGS. 5 and 6 are side views of the device illustrated in the previous figure, shown from opposite sides
Figure 6:
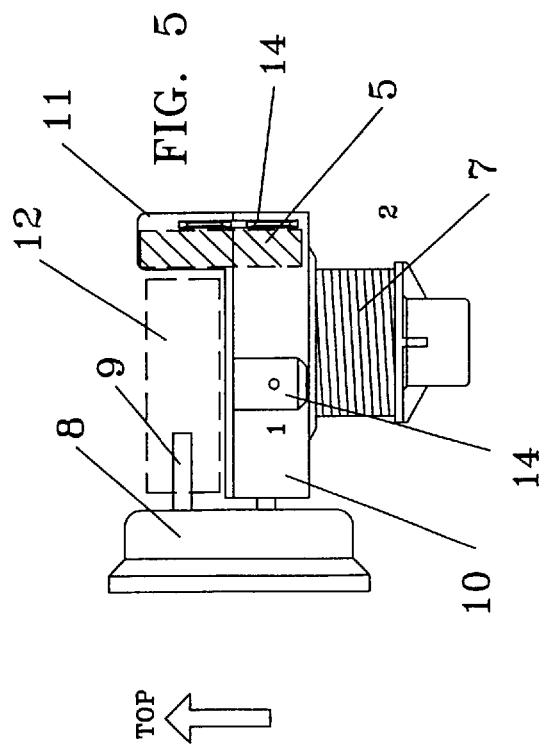

The PTC resistor can be installed on a plane basically parallel to the axis of coil 7, as illustrated in the Figures; in this configuration, the space alongside the projecting part of the casing that contains the PTC resistor is used to house a thermal protection device of known type, illustrated with a dotted line in FIGS. 4 and 6 and indicated as no. 12. The protection device therefore remains almost entirely inside the perimeter of the box, with considerable advantages in terms of compactness and practicality. Lid 11 could be fitted with fins or teeth so that it can be snap-fitted onto the body of box 10, and the whole casing could advantageously be moulded in a suitable type of plastic.

Female connectors 13 suitable for connecting to two of male contacts 9 of connector 8 will be fitted on one wall of box 10, and protection device 12 will be connected to the third contact.

Additional contacts 14 enable the device to be connected to the mains. The device with the configuration described can be rapidly assembled and easily fitted to the motor merely by connecting it to male contacts 10 of connector 8. When the motor is started, the relay contacts close and the current flows freely across the PTC resistor to the start winding.

During the first few revolutions of the motor the PTC resistor heats up, so that the current supplied to the winding is gradually reduced.

When the motor has reached the required number of revolutions, the relay opens again; at this point the motor has started and is operating normally.

What is claimed is:

1. Starting device for electric motors, comprising:

relay with a contact portion;

a PTC resistor connected in series with the contact portion of the relay; and a box (10), wherein the said PTC resistor (5) is installed on a plane roughly parallel to the axis of the coil (7) of said relay (4), and wherein the contacts (6) of the said relay and said PTC resistor are inserted in a roughly L-shaped box, in which the PTC resistor is housed at the foot of the said L shape, and in which a thermal protection device (12) is installed in the area between the wall of the said box and the said foot.

2. Starting device for electric motors in accordance with claim 1, further comprising female connectors (13) suitable for connecting to two male contacts (9) of a connector (8) fitted on one wall of box (10), a protection device (12) being connected to the third contact.

3. An electric motor starter, comprising:

an electric motor start winding having a first end and a second end;

an electric motor run winding having a first end and a second end;

a common power line having a first end and a second end, the second ends of the electric motor start winding, the electric motor run winding, and the common power line being connected at a common point;

a relay having a contact portion and a coil portion; and a PTC resistor, a first terminal of the contact portion of the relay being connected to the first end of the electric motor start winding, a second terminal of the contact portion of the relay being connected to a first terminal of the PTC resistor, a first terminal of the coil portion of the relay being connected to the first end of the electric motor run winding, a second terminal of the coil portion of the relay being connected to a second terminal of the PTC resistor, the second terminal of the coil portion of the relay, the second terminal of the PTC resistor, and the second end of the common power line being connected at a common point.

4. The start of claim 3, further comprising:

a container box surrounding the contact portion of the relay and the PTC resistor, the box, in side view, being L-shaped with a longer leg and a shorter leg, the shorter leg of the box housing the PTC resistor.

5. An electric motor starter, comprising:

an electric motor start winding, an electric motor run winding, and a common power line commonly electrically connected at a first point;

a relay with a contact portion and a coil portion; and a PTC resistor, the contact portion of the relay connected to the electric motor start winding and the PTC resistor, the coil portion of the relay connected to the electric motor run winding, the coil portion of the relay, the PTC resistor, and the common power line commonly electrically connected at a second point.

* * * * *